June 21, 1966 F. P. KOKESH 3,257,639
WELL LOGGING SYSTEM EMPLOYING AVERAGE TRAVEL TIME COMPUTATION
Filed Nov. 29, 1961 6 Sheets-Sheet 1

Frank P. Kokesh
INVENTOR.

BY
ATTORNEY

United States Patent Office 3,257,639
Patented June 21, 1966

3,257,639
WELL LOGGING SYSTEM EMPLOYING AVERAGE TRAVEL TIME COMPUTATION
Frank P. Kokesh, Seabrook, Tex., assignor to Schlumberger Well Surveying Corporation, Houston, Tex., a corporation of Texas
Filed Nov. 29, 1961, Ser. No. 155,676
6 Claims. (Cl. 340—18)

This invention relates to well logging systems and, more particularly, to acoustic well logging systems for obtaining measurements of acoustic parameters of a well bore through which the tool may be passed.

In the acoustic logging of well bores, considerable efforts have been devoted to the measurement of the time required for an acoustic impulse to travel over a short vertical section of a well bore where successive time measurements for such short sections are recorded as a function of depth. The derived time measurements are related to the characteristic velocity of the media forming the well bore, as well as the porosity of the media. Obviously, the accuracy of the time measurements is of extreme importance in providing accurately interpretable results.

When one considers that the time measurements are obtained from a borehole instrument disposed in a well bore which may have temperature conditions of up to 375° F. or more and pressures of 20,000 p.s.i. or more and that electrical signals from the borehole instrument must be transmitted to the earth's surface over a multiconductor cable which not only must provide a faithful transmission path but also supports the weight of the borehole instrument and is also subjected to well bore temperatures and pressures, the problems encountered in deriving an accurate time measurement are seen to be extremely complex. These problems may be neatly classified in three groups, i.e., the borehole instrument, the transmission and structural characteristics of the cable and the surface instrumentation.

It is necessary that the time measurements be reliable representations of the time required for acoustic energy to travel through the media forming the well bore to the exclusion of the time required for the acoustic energy to travel between the instrument and the media. Thus, in a borehole instrument where a single transmitter and receiver are used (hereinafter sometimes referred to as a T-R system), it is necessary to correct a time measurement value by an increment of time representing time of travel of acoustic energy between the instrument and adjacent media. Since this increment of time is sometimes subject to error due to irregular spacing of the instrument from the media, a single transmitter and two receiver system (hereinafter sometimes referred to as a T-R-R system) has been developed. In a T-R-R system, the time of arrival of an acoustic impulse at successive receivers is detected and the time interval between such detections measured. Thus, increment of time corrections for acoustic energy travelling between the instrument and the well bore are eliminated. However, even in this latter system, errors in time measurement arise where the instrument tilts relative to the axis of the well bore or the well bore surface is iregular due to changes in the diameter of the well bore. Thus, a borehole instrument with a T-R or T-R-R system inherently can be the cause of inaccuracy in time measurements because of positioning relative to the wall of the well bore. Or, in other words, the accuracy of these systems depends largely upon a uniform spacing of the transmitter and receiver from the wall of the well bore.

Considering now the signal detected in a borehole instrument, a detected signal may represent the time of emission of an acoustic impulse and/or represent acoustic energy as sensed by one or more receivers. The detected signals may be either transmitted via the cable to surface located time measuring means or supplied to time measuring means in the borehole instrument. In the latter instance, a signal representing a time measurement is conveyed to surface located indicating means via the cable.

Where the time measuring means are in the borehole instrument, a time measurement derived by such means is generally represented by a voltage signal. The downhole time measurement system is generally complex and expensive due to the instrumentation necessary to withstand the borehole temperature and pressure conditions, space limitations, shock, etc., and yet provide a reliable time measurement signal under the varying well bore conditions. However, this system can provide an analog signal representing a relatively short time measurement of 40 microseconds to 200 microseconds for a one foot span between receivers in a T-R-R system. An analog signal is transmitted through the cable to surface recording instruments.

To pass the detected signals as sensed by the receivers in the borehole instrument directly to the earth's surface has heretofore been undesirable because of the short time duration between detected signals and the fact that the cable affects the character of the detected signal. Distortions of the signal introduce errors in the time measurements at the earth's surface.

The faithful transmission of signals as detected in a borehole instrument to the surface instruments via a well logging cable with fidelity, however, has now been made possible by the use of an armored seven conductor cable in which six conductors are spirally embedded about a central, seventh conductor with equalizing means being provided for signal transmission purposes. The seventh conductor has been found ideally suited for the transmission of a signal with fidelity. Such a cable is described in a co-pending application assigned to the assignee of the present invention and is identified as patent application Serial No. 79,390, filed Dec. 29, 1960.

The beneficial transmission characteristics are ascribed mainly to the uniform spacing of the armor wires about the central conductor where the armor wires provide an electrical ground. By analogy, therefore, a coaxial type of cable would also be suitable for the transmission of a signal with fidelity.

Nonetheless, even through signals from the borehole instrument can now be transmitted via the cable to the earth's surface with fidelity, accurate time measurements of the travel of acoustic energy along the media forming the well bore are dependent upon the relative position of the borehole instrument in the well bore and accuracy of time measurement in the time measuring means.

Accordingly, it is an object of the present invention to provide new and improved acoustic logging systems in which the accuracy of time measurements at the earth's surface is markedly improved.

Another object of the present invention is to provide new and improved acoustic logging systems in which detection of acoustic signals is more accurately determined in the borehole independent of the geometry of the well bore relative to the borehole instrument.

Another object of the present invention is to provide new and improved acoustic logging systems with overall increased accuracy in measuring intervals of time.

The acoustic logging system in accordance with the present invention includes a borehole instrument comprised of an upper transmitter, an upper receiver, a lower receiver and a lower transmitter which are operated to obtain independent signals representing acoustic energy traversing the media forming the well bore from above and below the receivers and providing at least two time measurements which are averaged to provide an average travel time. Means at the earth's surface are provided to accurately determine time intervals between the emissions of acoustic impulses and arrival thereof at different receivers from a sequence of signals developed by the borehole instrument, the means at the earth's surface providing an ultimate averaged indication based upon acoustic energy emissions from both transmitters and acoustic arrivals at the respective receivers.

The novel features of the present invention are set forth with particularly in the appended claims. The present invention, both as to its organization and manner of operation together with further objects and advantages thereof, may best be understood by way of illustration and example of certain embodiments when taken in conjunction with the accompanying drawings in which:

Figures 1, 3, 10:
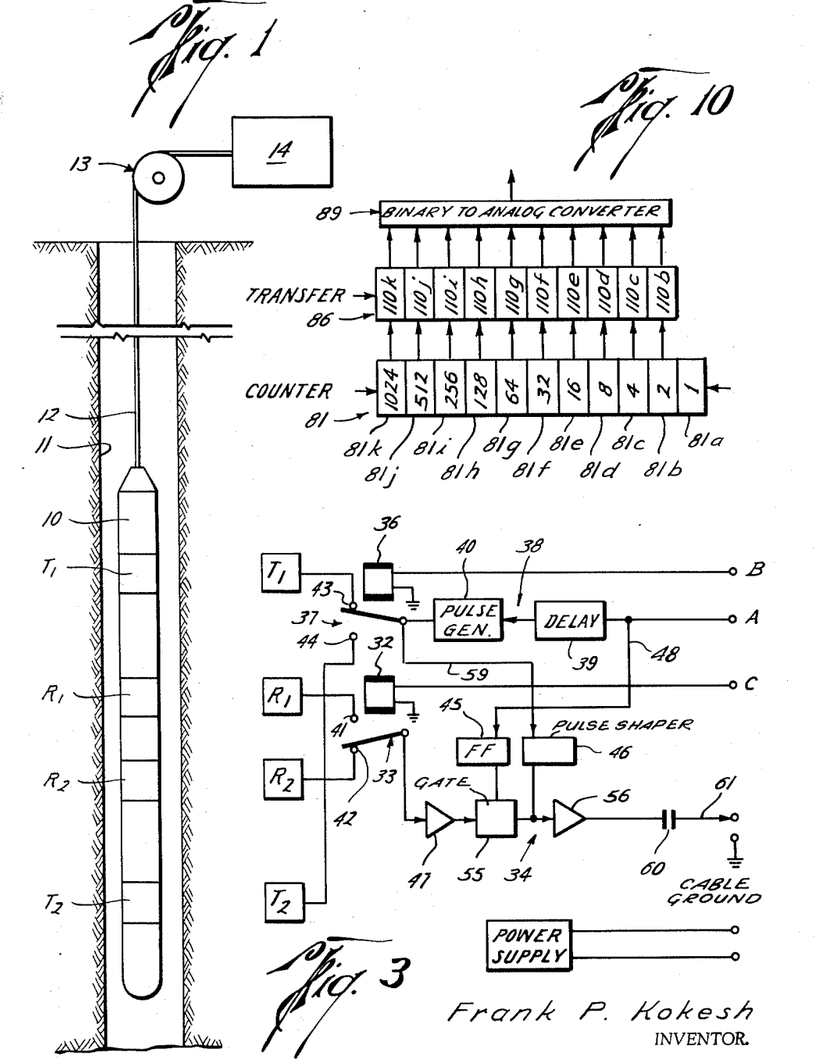
FIG. 1 is a view of a borehole instrument suspended in a well bore and coupled to circuitry at the earth's surface by a cable.
FIG. 3 is a schematic representation of circuitry in the borehole instrument.
FIG. 10 is a schematic representation of counter and transfer circuits of the present invention.

Referring now to FIG. 1, an acoustic logging tool or apparatus 10 is shown disposed in a bore hole 11 by means of a cable 12 which is spooled on a reel or winch 13 located at the earth's surface. The apparatus 10 is preferably centered in the well bore by conventional centering means (not shown).

The electrical circuitry in the tool 10 is coupled by the cable 12 to surface located electrical circuitry 14. The tool 10 includes an array of transducers which may, for example, be of the magnetostrictive type and are suitably suported in a fixed spaced relationship to one another in a well-known manner in the tool. The transducer arrangement provided includes an upper transmitter $T_1$, an upper receiver $R_1$, a lower receiver $R_2$ and a lower transmitter $T_2$ in longitudinal alignment with the spacing between the transmitter $T_1$ and receiver $R_1$ equal to the spacing between the transmitter $T_2$ and receiver $R_2$. Preferably, this spacing is on the order of three feet and the span between receivers $R_1$ and $R_2$ is on the order of one foot. The transmitter $T_1$ and receiver $R_1$ are thus symmetrical relative to the transmitter $T_2$ and receiver $R_2$ about a plane of symmetry midway between receivers $R_1$ and $R_2$.

The operational arrangement of the T-R-R-T system is such that the time of emission of a pulse of acoustic energy from a transmitter can be reliably detected at the earth's surface and the acoustic energy as detected by a receiver can be representively reproduced as an electrical signal at the earth's surface and the travel time of acoustic energy from the transmitter and through the adjacent media forming the well bore and back to a receiver can be measured with considerable accuracy. At the earth's surface, the transmitter-to-receiver signals are received by the circuitry 14 from the down hole tool 10 in a seqcence in which one transmitter is pulsed twice to provide emission signals alternating with signals respectively detected by receivers spaced a long and a short distance from the first transmitter; the other transmitter is also pulsed twice to provide emission signals alternating with signals respectively detected by receivers spaced a long and a short distance from the second transmitter. A pair of the sequenced signals thus represents the time interval between the emission of an acoustic pulse and its arrival at a given receiver. In the circuitry 14, a first time interval between the emission of an acoustic pulse and its arrival at a given receiver spaced the long distance from the first transmitter is stored in a counter circuit. A second time interval between the next succeeding acoustic emission of the first transmitter and the arrival of acoustic energy at the receiver spaced the short distance from the first transmitter is then subtracted from the first time interval. The next time interval between the emission of an acoustic impulse by the second transmitter and its arrival at a receiver spaced the long distance from the transmitter is added into the counter circuit. The subsequent time interval between the emission of an acoustic impulse by the second transmitter and its arrival at a receiver spaced the short distance from the transmitter is subtracted from the counter circuit. Thus, the net time interval count left in the counter is representative of two distinct times of travel of acoustic energy over a section of adjacent media between the two receivers. The net time interval in the counter is divided by two thereby to provide an average travel time of acoustic energy over the section of adjacent media. One of the prime advantages of this system is that the longer time intervals measured between an emission and detection of acoustic energy permit time for accurate transmission of the signals to the earth's surface whereas with a short spacing between receivers it is difficult to transmit the signals directly to the earth's surface. The transmitters above and below the receivers further provide for time measurements substantially independent of the instrument position relative to the wall or geometry of the well bore.

Figure 2:
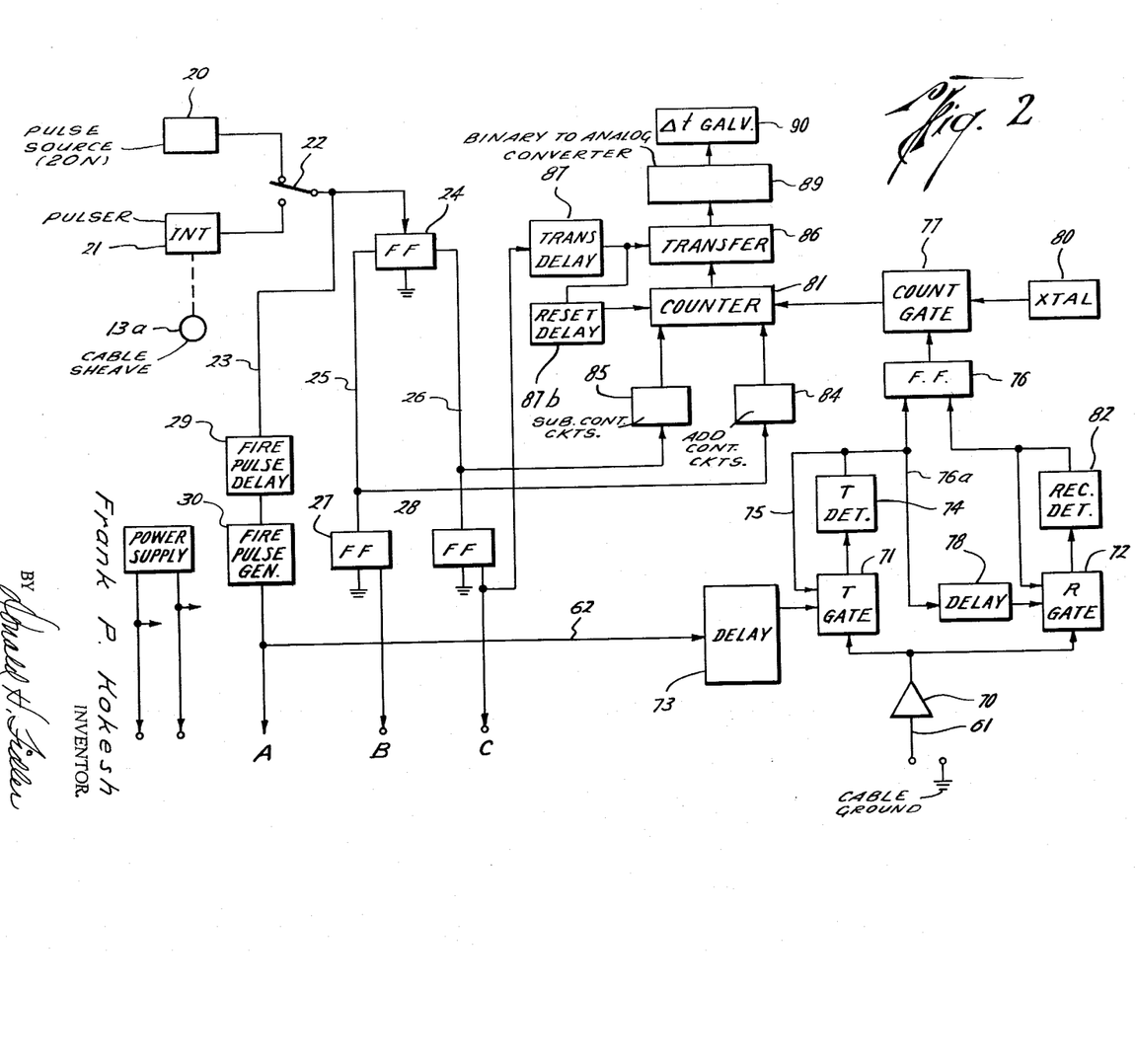
FIG. 2 is a schematic representation of the circuitry located at the earth's surface.

Reference is now made to FIGS. 2 and 3 for the respective details of the surface located electrical circuitry 14 and the electrical circuits in the apparatus 10. Also, reference will be made to FIGS. 4 and 5 wherein representative waveforms for various signals in the circuit are illustrated.

Figure 4:
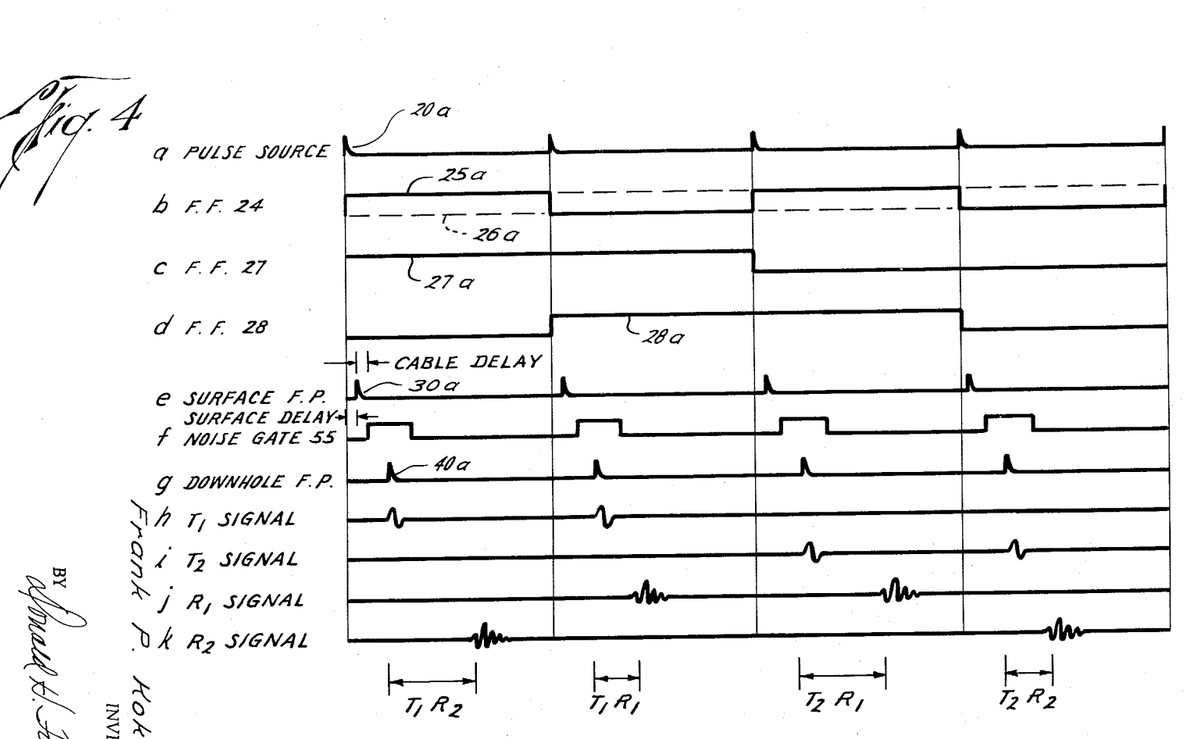
FIG. 4 is a view of typical waveforms particularly with reference to the operations between the surface equipment and borehole equipment.
Figure 5:
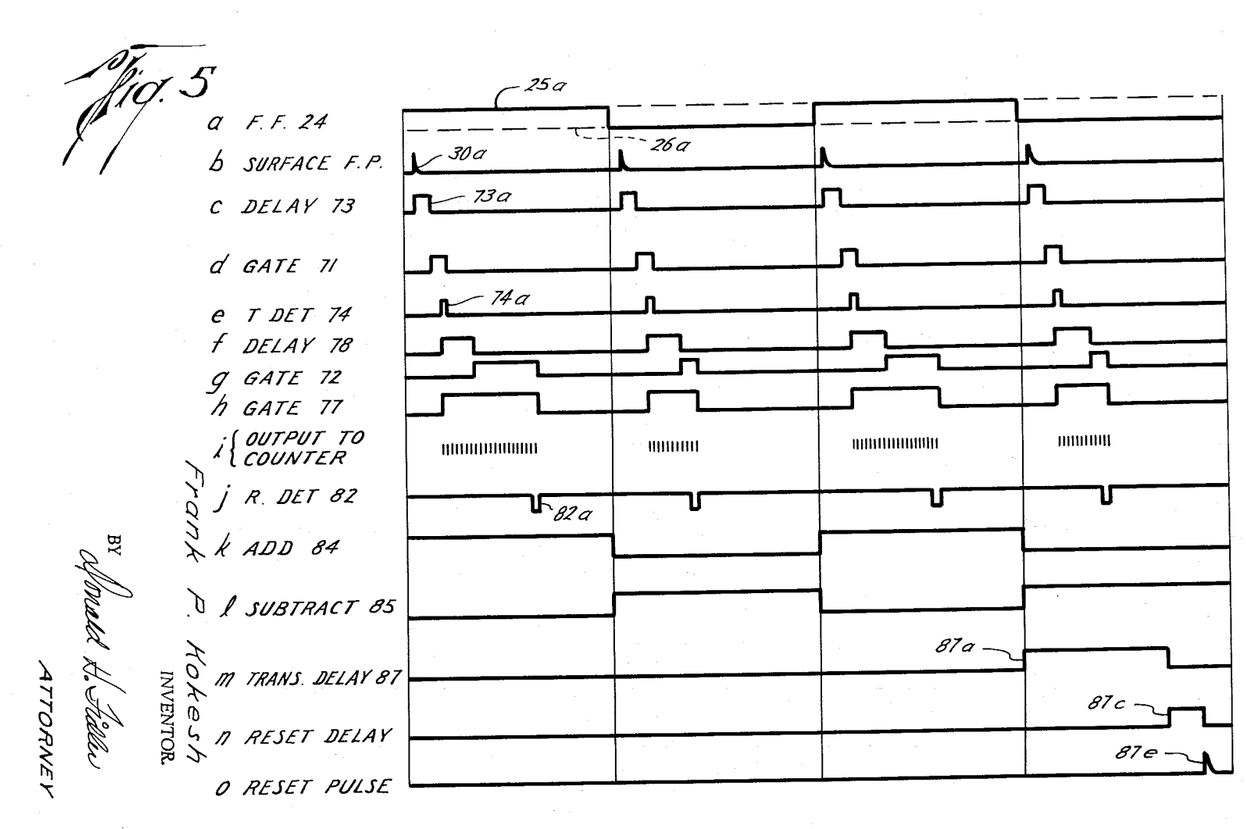
FIG. 5 is a view of typical waveforms particularly with reference to the operation of the surface equipment of FIG. 2.

As shown in FIG. 2, the repetitive pulsing of a transmitter in the logging instrument may be controlled by a periodic pulsing source 20 such as a twenty-cycle per second signal generator which is arranged to develop a signal output 20a (FIG. 4a) to pulse the transmitter independently of the travel of the tool. On the other hand, the movement of the cable can be coupled by means of a sheeve 13a in a well-known manner to a selsyn system or interval timer 21 to provide pulse signal outputs to the transmitter dependent upon the movement of the cable so that the pulsing of the transmitter is keyed to the movement of the tool through the well bore. A switch 22 is provided to connect either of these pulsing systems to a conventional flip-flop circuit 24 so that the output of a pulse source causes the flip-flop circuit 24 to reverse its operating condition. In FIG. 4b and FIG. 5a, a typical waveform 25a on conductor 25 is illustrated, the waveform 26a on conductor 26 being reversed in polarity and shown in dashed line.

Outputs from the flip-flop circuit 24 with respect to a ground potential are respectively conveyed by conductors 25, 26 to flip-flop circuits 27 and 28. A conductor output B is provided from the output of one side of flip-flop 27 and likewise, a conductor output C is provided from the output of one side of flip-flop circuit 28. Conductor outputs B and C are coupled via cable conductors to conductor inputs in the logging instrument (FIG. 3) which are correspondingly identified as B and C. In FIG. 4c, the waveform 27a of the output signal on conductor output B is illustrated while the waveform 28a of the output signal on conductor output C is illustrated in FIG. 4d. It should be appreciated that the output signals on conductor outputs B and C are 90° out of phase.

Referring now to FIG. 3, the conductor input C is connected to a solenoid 32 of a receiver switch 33. Thus, in one operating condition of the flip-flop circuit 28, the solenoid 32 is energized while in the other operating condition of the flip-flop circuit 28, the solenoid 32 is de-energized. The solenoid actuated receiver switch 33 connects a common signal output channel as indicated generally by the numeral 34 to first one receiver then the other. As will be explained more fully hereinafter, the output channel 34 includes amplifier 47, noise gate 55, and power amplifier 56 for coupling pulses indicative of the transmitter firing times and the received signals to the cable 61 for transmission to the surface. The conductor input B is connected to a solenoid 36 of a transmitter switch 37. Thus, in one operating condition of flip-flop circuit 27, the solenoid 36 is energized while in the other operating condition of flip-flop circuit 27, the solenoid 36 is de-energized. The solenoid actuated transmitter switch 37 connects a common transmitter channel as indicated generally by the numeral 38 to first one transmitter and then the other.

As shown in FIG. 3, the receivers $R_1$ and $R_2$ are respectively connected to the poles 41, 42 of the receiver switch 33, which has its movable contact arm connected to an amplifier 47 in the single signal channel 34. Receiver switch 33 as discussed above is automatically operated to change positions at the time that the flip-flop circuit 28 reverses operating conditions. The transmitters $T_1$ and $T_2$ are respectively connected to the poles 43, 44 of the transmitter switch 37 which has its movable contact arm connected to the single transmitter channel 38. Transmitter switch 37 is actuated to change positions at the time that the flip-flop circuit 27 reverses operating conditions.

Returning now to the FIG. 2, pulse selection switch 22 is also coupled by a conductor 23 to a conventional delay circuit 29. Delay circuit 29 is in turn, connected to a "fire" pulse generator 30. The time delay of delay circuit 29 is made, for example, about 9 milliseconds to enable all of the down hole switching of switches 33 and 37 to be accomplished prior to the initiation of a fire pulse from pulse generator 30. Pulse generator 30 is coupled by a conductor output A and the cable to a conductor input A of the transmitter channel 38 in the borehole instrument 10 (FIG. 3). The common transmitter channel 38, as shown in FIG. 3, includes a delay circuit 39 and a pulse generator 40 which has its output coupled to the movable arm of the transmitter switch 37. When a fire pulse 30a (FIG. 4e) from pulse generator 30 is transmitted through the cable to transmission channel 38 via conductor input A, the pulse 30a is conveyed to the delay circuit 39. Pulse 30a is also conveyed via a conductor 48 to a flip-flop circuit 45. The delay circuit 39 has a time delay, of say, a 100 to 200 microseconds to permit the receiver channel 34 to be blocked before a transmitter is actuated. Thereafter, the delay circuit 39 actuates the pulse generator 40 to develop a pulse output 40a (FIG. 4g) to trigger a transmitter which produces an acoustic impulse.

In the signal channel 34 (FIG. 3) the amplifier 47 is coupled to the movable arm of switch 33 and has its output connected to a power amplifier 56. Noise gate 55 is normally closed (FIG. 4f) for a short time duration in response to the fire pulse 30a from the pulse generator 30 actuating flip-flop 45 which controls the operation of gate 55. The time duration during which the noise gate 55 is closed is made long enough to block any signal from the receivers for transmission to the power amplifier 56 of the signal channel 34 prior to and shortly after the actuation of a transmitter.

The pulse output 40a (FIG. 4g) which triggers a transmitter also is supplied from the pulse generator 40 via a conductor 59 to a pulse shaper 46 which shapes the signal 40a indicating the time occurrence of the firing of the transmitter. The signal 40a from pulse shaper 46 is conveyed to amplifier 56 which is coupled via a capacitor 60 to the central or seventh conductor 61 of cable 12. The signal 40a from the pulse shaper 46 is thus transmitted via the cable 12 by the mode of the seventh conductor and the cable armor which is at electrical ground potential. Capacitor 60 is sized of a value in accordance with the electrical band width of response for the cable 12 to transmit the frequencies in the electrical signal corresponding to the acoustic energy as received by a receiver to the surface in a reliable manner. Thus, the transmission characteristics of a cable are equalized to insure a high fidelity signal at the surface of the earth.

At the earth's surface as shown in FIG. 2, the cable conductor 61 from the single channel 34 in the bore hole apparatus 10 is connected to an amplifier 70 which, in turn, is connected to normally closed signal gate circuits 71 and 72. The transmitter signal gate 71 has its gate control circuit connected to a conventional delay circuit 73 which is, in turn, coupled by a conductor 62 to the fire pulse generator 30. The fire pulse 30a (FIG. 5b or FIG. 4e) actuates the delay circuit 73 which, after a suitable time delay 73a (FIG. 5c) has elapsed following the development of the fire pulse 30a, opens the gate 71 as shown in FIG. 5d. The time delay of circuit 73 is less than the time delay of delay circuit 39 (FIG. 3) so that gate 71 is opened prior to the arrival of a pulse 40a indicating the triggering of a transmitter. After gate 71 is opened or actuated, the pulse signal 40a conveyed via the amplifier 56 of the signal channel 34, the conductor 61 and amplifier 70 is passed through the gate 71 to a time of occurrrence of signal detector 74 which develops an output pulse 74a (FIG. 5e). The time of occurrence detector 74 may be a suitable conventional triggering circuit arranged to produce an output trigger signal 74a (FIG. 5e) whenever the amplitude of an applied input signal from amplifier 70 exceeds a predetermined level. Thus, the detector 74 is triggered upon receipt of the signal 40a from the pulse generator 40 while the gate 71 is open. The output signal 74a of the detector 74 is returned to the gate 71 via a conductor 75 to close the gate 71 immediately after the detector 74 is actuated. The output signal 74a of the detector 74 is also supplied via a conductor 76a to a flip-flop circuit 76 which actuates a time or count gate 77 (FIG. 5h). Conductor 76a also is connected to a delay circuit 78 which, in response to signal 74a from the detector 74 and, after a suitable predetermined time, (FIG. 5f) actuates or opens the remaining gate circuit 72 for operation (FIG. 5g). Normally, gate circuit 72 is opened by the delay circuit 78 just prior to the earliest expected arrival of an acoustic impulse at a receiver.

The timing gate 77, when turned on, permits the output signal (FIG. 5i) from a high frequency crystal oscillator 80 (for example, 5 megacycles for the described T-R-R-T preferred spacing) to be supplied to a counter circuit 81 which counts the pulse output from the crystal oscillator. Thereafter, a receiver signal supplied via amplifier 70 and cable conductor 61 to the receiver gate 72 is passed to a time of occurrence detector 82 which is similarly actuated upon the signal exceeding a predetermined amplitude level. The output signal 82a (FIG. 5j) of the detector 82 turns the timing gate 77 off (FIG. 5h) and also turns the receiver gate 72 off (FIG. 5g).

During the time interval that the timing gate 77 is "on" or open, a number of pulses are supplied to the counter 81 which number is related to the time interval between an emitted transmitter pulse and a receiver signal. The counter circuit 81 is arranged to add or store the count representing a first time interval by virtue of an add circuit 84 connected to conductor 25 of the flip-flop circuit 24. Thus, when the output signal 25a (FIG. 5a) of flip-flop circuit 24 operates flip-flop circuit 27, the add circuit 84 is simultaneously actuated (FIG. 5k) to condition the counter 81 to add or store the pulse output from the crystal oscillator 80 during the time that timing gate 77 is open. On the next succeeding output signal 26a (shown in dashed line in FIG. 5a) from the flip-flop circuit 24, the flip-flop circuit 28 and a subtract circuit 85 are actuated (FIG. 5l) to condition the counter 81 to subtract the output pulses of the crystal oscillator 80 from the previous retained count in the counter 81.

Figure 6A:
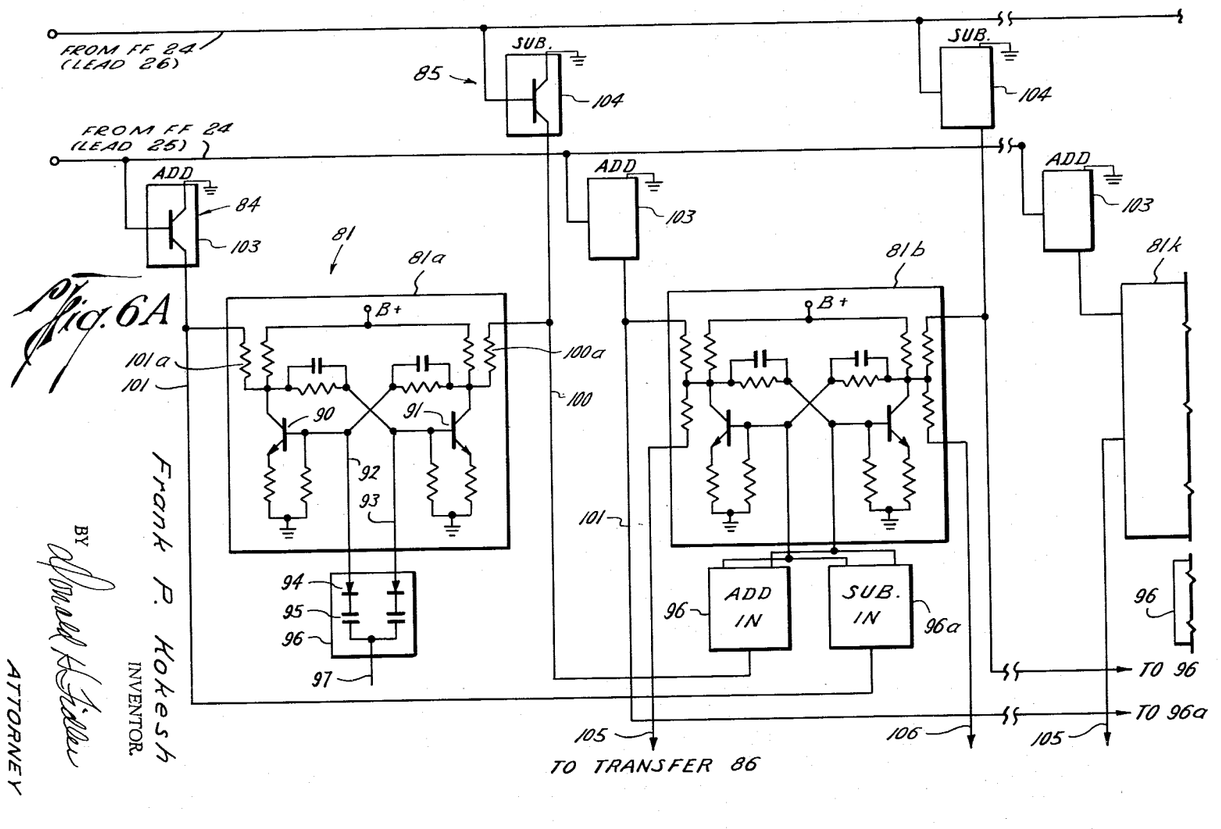
FIGS. 6a and 6b are diagrammatic views of surface located time measuring means.
Figures 6B, 7, 8, 9:
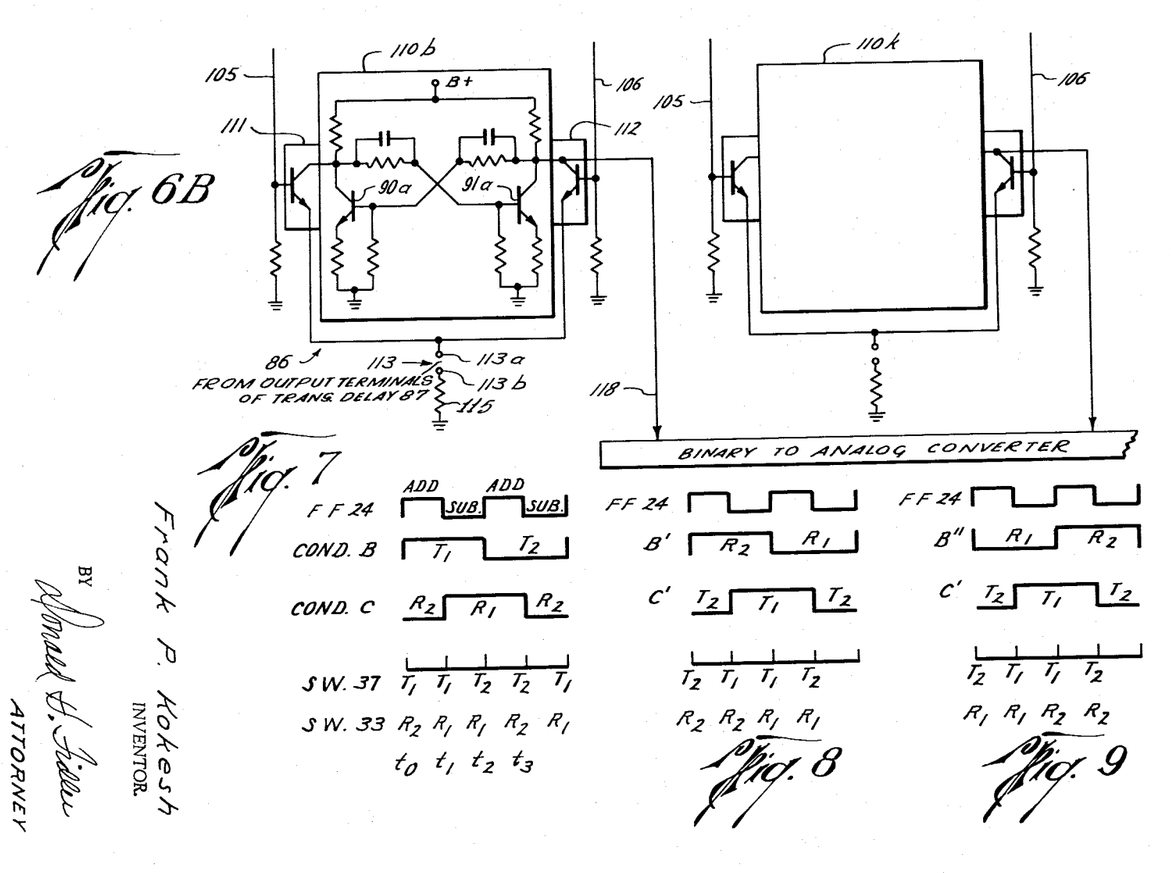
FIGS. 7–9 are simplified representations of various timing sequences of the system.

The arrangement operates in a sequence which may best be understood by a consideration of FIG. 7. At the time $t_0$, the waveforms on conductors outputs B and C and flip-flop 24 may be assumed to be as shown in FIG. 7 with the resulting connection of transmitter $T_1$ to the transmitter channel 38 and the connection of receiver $R_2$ to the signal channel 34. Thus, as shown in FIGS. 4h and 4k, the transmitter and receiver signals from transmitter $T_1$ and receiver $R_2$ would cause timing gate 77 to be open for a time interval during which the pulse output of the crystal oscillator 80 is added into the counter circuit 81. At the time $t_1$ (shown in FIG. 7), flip-flop circuit 24 actuates the subtract circuit 85 for the counter 81, transmitter switch 37 is unchanged and the receiver switch 33 is actuated. Thus, transmitter $T_1$ is connected to channel 38 and receiver $R_1$ is connected to channel 34. The output of the crystal oscillator 80 in the time interval between an emission of acoustic energy from the transmitter $T_1$ (FIG. 4h) and its arrival at the receiver $R_1$ (FIG. 4j) is subtracted from the count in the counter circuit 81 so that the count left in the counter 81 represents the time interval during which acoustic energy travelled the earth formations between the receivers $R_1$ and $R_2$. At the time $t_2$ as shown in FIG. 7, flip-flop circuit 24 actuates the add circuit 84 for the counter, transmitter switch 37 is actuated and receiver switch $T_2$ is connected to transmitter channel 38, and receiver $R_1$ is connected to signal channel 34 since the receiver switch 33 remains unchanged. The output of the crystal oscillator 80 in the time interval between the emission of an acoustic impulse from transmitter $T_2$ (FIG. 4i) and its arrival at the receiver $R_1$ (FIG. 4j) is added in the counter and represents the time interval during which acoustic energy travelled between the transmitter $T_2$ and receiver $R_1$. At the time $t_3$ as shown in FIG. 7, flip-flop circuit 24 actuates the subtract circuit 85 for the counter, transmitter switch 37 remains unchanged and receiver switch 33 is actuated. Thus, transmitter $T_2$ is connected to transmitter channel 38 and receiver $R_2$ is connected to signal channel 34. The output of the crystal oscillator in the time interval between the emission of an acoustic impulse from transmitter $T_2$ (FIG. 4i) and its arrival at the receiver (FIG. 4k) is subtracted from the count in the counter and represents the time interval during which acoustic energy travelled between the transmitter $T_2$ and receiver $R_2$.

From the foregoing description it will be appreciated that if:

$t_a$ is the time of travel of acoustic energy between transmitter $T_1$ and receiver $R_2$;

$t_b$ is the time of travel of acoustic energy between transmitter $T_1$ and receiver $R_1$;

$t_c$ is the time of travel of acoustic energy between transmitter $T_2$ and receiver $R_1$; and $t_d$ is the time of travel of acoustic energy between transmitter $T_2$ and receiver $R_2$;

then $\Delta t$, the average time of travel of acoustic energy between receivers $R_1$ and $R_2$ may be expressed as $$\Delta t = \frac{t_a - t_b + t_c - t_d}{2} \tag{1}$$

The average time of travel $\Delta t$ is thus based upon acoustic energy emitted from above and below the receivers and is an average of two distinct time measurements. This reading minimizes errors due to tilt of the apparatus in the well bore or caves in the well bore and very greatly improves the accuracy of the $\Delta t$ time measurement.

To obtain a measurement of the average net count of the $\Delta t$ time remaining in the counter 81, a transfer circuit 86 (FIG. 2) is connected to the counter 81 so as to divide by two the net count in the counter. The transfer circuit 86 is actuated by means of a signal 87a (FIG. 5m) from a delay circuit 87 which is coupled to conductor output C of flip-flop circuit 28. Signal 87a from delay circuit 87 actuates the transfer circuit 86 after the last time measurement and just prior to the start of a new cycle of the system. The transfer circuit 86 when actuated immediately reads out an average net count from the counter 81. The average net count as read by the transfer circuit 81 is translated by conventional binary to analog converter (BAC) 89 into a voltage signal supplied to the conventional galvanometer 90 in a recorder (not shown) to produce an indication representative of the net time interval measured by the counter 81. Galvanometer 90 can, of course, be calibrated to indicate either time or velocity measurements in a well-known manner.

The transfer delay circuit 87 also has its output coupled to a reset delay circuit 87b which after a suitable delay 87c (FIG. 5n), resets the counter 81 by means of a reset pulse 87e (FIG. 5o) a short time after the net count in the counter 81 has been transferred to the transfer circuit 86 and just prior to the next fire pulse 30a so that the counter 81 is reset to measure the timing measurements of the next sequential operation.

Referring now to FIGS. 6a, 6b and FIG. 10, the details and overall arrangement of the counter circuit 81, the subtraction circuits 85, the addition circuits 84, and the transfer circuit 86, will now be explained. As shown in FIG. 10, the counter circuit 81 is basically comprised of a plurality of bistable multivibrator units 81(a–k) coupled to one another to form a binary counting system. In the preferred embodiment of the invention, eleven such individual units or stages are connected to one another in which the units provide a digital output representative of the number of pulses applied to its input. For simplicity of illustration, in FIG. 6a only the first, second, and part of the last unit of the counter are shown, it being understood that the intermediate units have similar arrangement to the system to be explained.

Each multivibrator of counter 81 has transistors 90, 91 cross-coupled to one another and responsive to a common input pulse to their respective bases to change operating conditions. The input pulse signal from the gate 77 to the first multivibrator of the counter 81 is supplied to a common input connection 97 of an input circuit 96 comprised of a diode 94 and capacitance 95 in series connection with each of conductors 92, 93, the capacitances 95 terminating in the common input connection 97 and the conductors 92, 93 being connected to the respective bases of transistors 90 and 91. Hence, as the pulses of a pulse signal supplied via the gate circuit 77 are applied to the respective bases of the transistors 90, 91 in the first multivibrator 89, the multivibrator reverses operating conditions for each applied pulse of the pulse signal.

In the typical manner of counter circuits, in the first multivibrator 81a, the collector of the first transistor 90 provides an output signal which indicates either a 0 or 1 digit and the collector of the second transistor 91 provides an output signal which indicates either a 0 or 1 digit. In the next adjoining multivibrator 81b and throughout the successive multivibrator units, the first transistor thereof would likewise provide an output signal which indicates either a 0 or 1 digit and the second transistor thereof would provide an output signal which indicates either a 0 or 1 digit. To add a number of successive pulse inputs in the binary counter 81, the output of the second transistor 91 of each multivibrator is connected to an input circuit 96 of the next adjacent multivibrator by means of the output conductors 100 and isolation resistors 100a. To subtract a number of successive pulse inputs from a number of pulses which are stored in the binary counter by addition, the output of the first transistor of each multivibrator unit is connected to an input circuit 96a of the next adjacent multivibrator by means of output conductors 101 and isolation resistors 101a. Input circuits 96a are identical to input circuits 96 and are connected in parallel.

To perform the addition of separate and distinct pulse inputs, add circuits 84 are connected to the subtract output conductors 101. The add circuits 84 are provided with add switches 103 in the form of transistors which, when actuated by a commonly applied pulse signal, short the subtract output conductors 101 to ground so that only the add outputs of second transistors 91 on conductors 100 are effective in operating the multivibrators. To perform the subtraction of a pulse input, subtract circuits 85 are connected to the add output conductors 100 to adjacent multivibrators. The subtract control circuits 85 are likewise provided with subtract switches 104 in the form of transistors which, when actuated by a commonly applied pulse signal, will short the add output conductors 100 to ground so that only the subtract outputs on conductors 101 are effective in operating the multivibrator units. Thus, it will be appreciated that the add control circuits 84, when actuated by a common signal from the flip-flop circuit 24 over lead 25, cause the counter 81 to add the pulse output from the crystal oscillator during the time gate 77 is open. The time that gate 77 is open is determined by the time of pulsing of a transmitter and the subsequent arrival of the acoustic energy at a far receiver for example, between transmitter $T_1$ and receiver $R_2$. When the flip-flop circuit 24 reverses its operating conditions, the subtract control circuits 85 are actuated and the counter 81 is then conditioned to subtract the pulse output from the crystal oscillator during the time gate 77 is open. The time that gate 77 is open is now determined by the time of pulsing of a transmitter and the subsequent arrival of the acoustic energy at a near receiver, for example, transmitter $T_1$ and receiver $R_1$. The net count of pulses are digitally stored in the counter circuit 81 after addition and subtraction represents the net time for acoustic energy to travel the earth formations between the two receivers. Thus, the next addition and subtraction of pulses representing the travel time of acoustic energy between $T_1-R_2$ and $T_2-R_2$ respectively leave a net count in the counter of two net times for acoustic energy to travel the earth formations between two receivers where the net times are derived from pulsing of a transmitter above and below the detecting receivers.

The average net count in the counter circuit 81 is read out in the following manner: A transfer circuit 86 is provided which is comprised of multivibrator units 110(b–k) identical to the multivibrator units 89 of the counter circuit 81 except that a multivibrator unit corresponding to the multivibrator unit 81a of counter 81 is omitted. Thus, ten multivibrator units 110(b–k) are provided. The ten such multivibrator units 110(b–k) are connected to the last ten units 81(b–k) of the counter 81 so that a transfer of the net count in the counter 81 is effectively divided by a factor of two thereby providing an average net count in the transfer circuit 86.

In the transfer circuit 86 as shown in FIG. 6b, each of the multivibrator units has transistors 90a and 91a. Transistors 90a and 91a are each provided with a transfer switch 111 and 112 in the form of a transistor. The transistors of the switches 111 and 112 have their collectors connected to the respective collectors of the multivibrator transistor 90a and 91a and the respective emitters of the transistors in switches 111 and 112 are connected to a common input 113. Input 113 is common to all of the multivibrators 110(b–k) and has input terminals 113a and 113b where terminal 113a is connected to switches 111, 112 and terminal 113b is connected by a resistance 115 to ground. The bases of the transistors in the respective transfer switches 111, 112 are respectively coupled by conductors 105, 106 to the outputs of a corresponding positioned multivibrator in the counter 81. In operation, an input or transfer signal 87a from delay circuit 87 (after the net count is in counter 81) is supplied to input 113 which causes the transistors in the transfer switches 111, 112 of each multivibrator unit 110(b–k) to conduct in preference to the conductive state of the corresponding transistor 90 or 91 in the counter 81 so that the respective transistors 90a and 91a in each multivibrator unit 110(b–k) align their respective conductive states to correspond to the respective conductive states of transistors 90 and 91 in the counter 81. Thus, the net count in the last ten units of counter 81 is transferred to the multivibrator units 110 of the transfer circuit 86. An output conductor 118 coupled to the second transistor of each of the multivibrator units 110(b–k) and connected to the BAC circuit 89 which converts the digital number of the multivibrator units 110(b–k) into an analog voltage signal in a well-known manner.

It should be appreciated that the number of multivibrator units of counter 81 may be less than the number required to count the entirety of pulses from an add input provided that the number of units are adequate to indicate the difference between add and subtract inputs.

It should also be appreciated that the described timed sequence of signals between the transmitter and receivers is $$T_1R_2-T_1R_1+T_2R_1-T_2R_2$$

This sequence may, for example, be changed by reversing the output connections B and C to the input connections B and C of the borehole instrument 10. Assuming that B' (not shown) is the output of flip-flop 27 connected to input connector C in the instrument 10 and that C' (not shown) is the output of the second stage flip-flop 28 connected to input connector B in the instrument 10; then as shown in FIG. 9, the counter 81 would measure a sequence as follows:

$$+T_2R_2-T_1R_2+T_1R_1-T_2R_1$$

In the case of FIG. 8, the net count remaining in the counter 81 even though represented by a negative number is still representative of the travel time.

In still another example, if the first stage of flip-flop 27 rather than the second stage is connected to input connector C in the instrument 10 by a conductor B" (not shown) and a conductor C' (not shown) is the output of the second stage of flip-flop 28 connected to input connector B in the instrument 10; then, as shown in FIG. 10, the counter 81 would measure a sequence as follows:

$$T_2R_1-T_1R_1+T_1R_2-T_2R_2$$

In this case the net count remaining in the counter would still be representative of the travel time.

Other sequences are also possible provided that the main objective of subtracting the lesser time measurements from the greater time measurements is accomplished. This is made possible because only the net count in the counter is read out. Thus, the sequence of entering the time measurements may be changed without affecting the net count provided that the addition and subtraction is properly related to obtain the average time $\Delta t$.

It will also be appreciated that while the average net count is obtained by dividing the count in counter 81 by a particular relationship between the counter 81 and transfer circuit 86, other well-known arrangements may be used to divide the total count in the counter 81 by a factor of two.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. An acoustic logging system for use in a well bore comprising: a borehole instrument sized for passage through a well bore and having spaced upper and lower acoustic transmitter means and at least two acoustic receiver means therebetween, signal output channel means in said instrument for coupling signals for transmission to the earth's surface, means coupling said transmitter means, said receiver means, and said signal output channel means for developing in said signal output channel means a signal representation of an individual transmitter-to-receiver acoustic travel time of acoustic energy between each of said transmitter means and each of said receiver means, for successive depth intervals, means for transmitting said signals to the earth's surface, means at the earth's surface responsive to said signals to combine the travel times represented by said signals and provide average time measurements of the travel time of acoustic energy between said receiver means, and means coupled to said combining means to record said average time measurements as a function of depth.

2. An acoustic logging system comprising: a borehole instrument sized for passage through a well bore and having upper and lower acoustic transmitter means, and upper and lower acoustic receiver means therebetween, a signal output channel in said instrument, means coupled between said transmitter means, said receiver means, and said signal output channel for keying said transmitter means and said receiver means to said signal output channel to provide sequential signal outputs respectively from the upper transmitter means and the upper receiver means, the upper transmitter means and the lower receiver means, the lower transmitter means and the upper receiver means, the lower transmitter means and the lower receiver means wherein said sequential signal outputs mark a respective emission and detection of acoustic energy travelling between a respective transmitter and receiver combination, and means coupled to said signal output channel for receiving such sequential outputs and subtracting the two lesser time intervals measured between an emission and detection of acoustic energy from the two larger time intervals measured between an emission and detection of acoustic energy to provide an average time measurement of the time of travel of acoustic energy between said receiver means.

3. An acoustic logging system comprising: a borehole instrument sized for passage through a well bore and having an upper and lower acoustic transmitter means, and upper and lower receiver means therebetween, a signal channel in said instrument, transmitter actuating means in said instrument, receiver switch means coupled between said receiver means and said signal channel for selectively connecting one or the other of said receiver means to said signal channel, transmitter switch means coupled between said transmitter means and said transmitter actuating means for selectively connecting one or the other of said transmitter means to said transmitter actuating means and to said signal channel, additional actuating means coupled to said transmitter and receiver switch means and said transmitter actuating means for keying the operation of said transmitter and receiver switch means and said transmitter means in a repetitive sequence to connect one of said transmitter means to said transmitter actuating means once for each connection of the respective receiver means to the signal channel and the other of said transmitter means to said transmitter actuating means once for each connection of the respective receiver means to the signal channel.

4. An acoustic logging system comprising: a borehole instrument sized for passage through a well bore and having an upper and lower acoustic transmitter means, and upper and lower receiver means therebetween, a signal channel in said instrument, transmitter actuating means in said instrument including an output to said signal channel, receiver switch means coupled between said receiver means and said signal channel for selectively connecting one or the other of said receiver means to said signal channel means, transmitter switch means coupled between said transmitter means and said transmitter actuating means for selectively connecting one or the other of said transmitter means to said transmitter actuating means; surface located actuating means coupled to said transmitter and receiver switch means and said transmitter actuating means for keying the operation of said transmitter and receiver switch means and said transmitter means in a repetitive sequence to connect one of said transmitter means to said transmitter actuating means once for each connection of the respective receiver means to the signal channel and the other of said transmitter means to said transmitter actuating means once for each connection of the respective receiver means to the signal channel.

5. An acoustic logging system for use in a well bore comprising: a borehole instrument sized for passage through a well bore and having spaced upper and lower acoustic transmitter means and at least two acoustic receiver means therebetween, a signal output channel in said instrument, means coupled to said transmitter and receiver means and said signal output channel for developing in said channel a signal representation of an individual transmitter-to-receiver acoustic travel time between each of said transmitter means and each of said receiver means for successive depth intervals; means coupled to said signal output channel to provide pulse signals in response to said developed signals, means coupled to said pulse signal means for combining at least two pulse signals from said pulse means representing at least two transmitter-to-receiver acoustic travel times for a given depth in a well bore to provide a net pulse output signal, means to key said combining means and said signal developing means to combine such transmitter-to-receiver travel times in a predetermined manner, and means coupled to said combining means to derive indications of an average net pulse output signal.

6. An acoustic logging system for use in a well bore comprising: a borehole instrument sized for passage through a well bore and having spaced upper and lower acoustic transmitter means and at least two acoustic receiver means symmetrically disposed therebetween, means for selectively actuating said transmitter means and said receiver means to render operable in sequence a plurality of different transmitter-receiver means pairs for each of successive depth intervals, thereby to produce for each said interval sequential signals indicative of a plurality of individual acoustic energy travel times between the transmitter and receiver means of each of the respective pairs rendered operable thereat, a signal output channel including noise reduction means in said instrument for coupling said signals for transmission to the earth's surface, means coupled to said signal output channel to transmit said signals to the earth's surface, means at the earth's surface responsive to said signals to combine the transmitter-to-receiver means travel times represented by said signals and provided for each of said intervals an average measurement of the travel time of acoustic energy between said receiver means, and means coupled to said combining means to record said average time measurements as a function of depth.

References Cited by the Examiner

UNITED STATES PATENTS 2,708,485 5/1955 Vogel ______________ 181—0.53
3,081,838 3/1963 Platt _______________ 181—.53

BENJAMIN A. BORCHELT, *Primary Examiner.*

SAMUEL FEINBERG, CHESTER L. JUSTUS,
*Examiners.*

UNITED STATES PATENT OFFICE
CERTIFICATE OF CORRECTION

Patent No. 3,257,639 June 21, 1966

Frank P. Kokesh

It is hereby certified that error appears in the above numbered patent requiring correction and that the said Letters Patent should read as corrected below.

Column 1, line 62, for "iregular" read -- irregular --; column 2, line 54, for "through" read -- though --; column 3, line 25, for "particularly" read -- particularity --; column 6, line 30, after "single" insert -- signal --; line 47, for "occurrrence" read -- occurrence --; column 13, line 6, for "provided" read -- provide --.

Signed and sealed this 22nd day of August 1967.

(SEAL)
Attest:

ERNEST W. SWIDER
Attesting Officer

EDWARD J. BRENNER
Commissioner of Patents